(12) United States Patent
Yi

(10) Patent No.: US 9,611,819 B2
(45) Date of Patent: Apr. 4, 2017

(54) AIR FILTER ASSEMBLY WITH CHARCOAL CANISTER

(71) Applicants: CHONGQING FENGRUI PLASTIC Co., Ltd., Chongqing (CN); CHONGQING BAIKE PLASTIC INDUSTRY Co., Ltd., Chongqing (CN)

(72) Inventor: Zhang Yi, Chongqing (CN)

(73) Assignees: CHONGQING FENGRUI PLASTIC Co., Ltd., Chongqing (CN); CHONGQING BAIKE PLASTIC INDUSTRY Co., Ltd., Chongqing (CN)

( * ) Notice: Subject to any disclaimer, the term of this patent is extended or adjusted under 35 U.S.C. 154(b) by 110 days.

(21) Appl. No.: 14/422,061

(22) PCT Filed: Jan. 8, 2015

(86) PCT No.: PCT/CN2015/070329
§ 371 (c)(1),
(2) Date: Feb. 17, 2015

(87) PCT Pub. No.: WO2016/033924
PCT Pub. Date: Mar. 10, 2016

(65) Prior Publication Data
US 2016/0273497 A1    Sep. 22, 2016

(30) Foreign Application Priority Data

Sep. 1, 2014   (CN) .......................... 2014 1 0441144

(51) Int. Cl.
*B01D 53/02*   (2006.01)
*F02M 35/02*   (2006.01)
(Continued)

(52) U.S. Cl.
CPC ......... *F02M 35/0218* (2013.01); *B01D 53/04* (2013.01); *B01D 53/0407* (2013.01);
(Continued)

(58) Field of Classification Search
CPC ........ B01D 2259/4516; B01D 53/0407; B01D 2257/702; B01D 45/16; B01D 46/0046;
(Continued)

(56) References Cited

U.S. PATENT DOCUMENTS 2,787,333 A * 4/1957 Boone .................... A62B 23/00
                                                    210/486
6,343,591 B1 * 2/2002 Hara .................. B01D 46/0036
                                                    123/519

(Continued)

FOREIGN PATENT DOCUMENTS

CN      202117798 U    1/2012
CN      203894020 A    7/2014
(Continued)

*Primary Examiner* — Christopher P Jones
(74) *Attorney, Agent, or Firm* — Andrew W. Chu; Craft Chu PLLC

(57) ABSTRACT

The air filter assembly with charcoal canister includes an air filter and charcoal canister. The air filter and charcoal canister connect with each other by clamping. The charcoal canister and filter are connected with each other with compact structure and overall appearance. The assembling is simplified, and time and costs are saved.

4 Claims, 1 Drawing Sheet

(51) Int. Cl.
*B01D 53/04* (2006.01)
*F02M 25/08* (2006.01)
*F02M 35/024* (2006.01)
*B60K 15/035* (2006.01)

(52) U.S. Cl.
CPC ............ *F02M 25/08* (2013.01); *F02M 35/02* (2013.01); *F02M 35/02441* (2013.01); *B01D 2253/102* (2013.01); *B01D 2259/401* (2013.01); *B01D 2259/40001* (2013.01); *B01D 2259/4516* (2013.01); *B60K 2015/03514* (2013.01)

(58) Field of Classification Search
CPC ...... B01D 46/10; B01D 50/002; B01D 53/24; Y10T 137/86324; Y10T 137/86348
See application file for complete search history.

(56) References Cited

U.S. PATENT DOCUMENTS

| | | | | |
|---|---|---|---|---|
| 6,959,698 | B2 * | 11/2005 | Ikuma | ................ F02M 25/0854 123/516 |
| 7,472,694 | B2 | 1/2009 | King | |
| 2007/0107702 | A1 * | 5/2007 | King | ................ F02M 25/0854 123/520 |
| 2013/0186269 | A1 * | 7/2013 | Cheng | ................ B01D 53/228 95/47 |

FOREIGN PATENT DOCUMENTS

| | | | |
|---|---|---|---|
| DE | 60013235 | T2 | 8/2005 |
| JP | 2002048015 | A | 2/2002 |

* cited by examiner

AIR FILTER ASSEMBLY WITH CHARCOAL CANISTER

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to a new kind of air filter assembly with a charcoal canister.

2. Description of Related Art Including Information Disclosed under 37 CFR 1.97 and 37 CFR 1.98.

In the current market, generally charcoal canisters and air filters are independent, and connected with each other by air pipe. It is neither well-done nor reliable.

SUMMARY OF THE INVENTION

The present invention is to solve the technology problem by a new kind of air filter assembly with charcoal canister.

The present invention solves the above problem by the technical solution as follows: a new kind of air filter assembly with charcoal canister, comprising air filter and charcoal canister. Said air filter and charcoal canister are clamped so as to be connected with each other.

The present invention has the advantages that the charcoal canister and filter are connected with each other with compact structure and overall appearance. The assembling is simplified, and time and costs are saved.

DETAILED DESCRIPTION OF THE DRAWINGS

The following descriptions of the embodiments and their accompanying drawings of the present invention are intended to illustrate and not to limit this invention.

Figure 1:
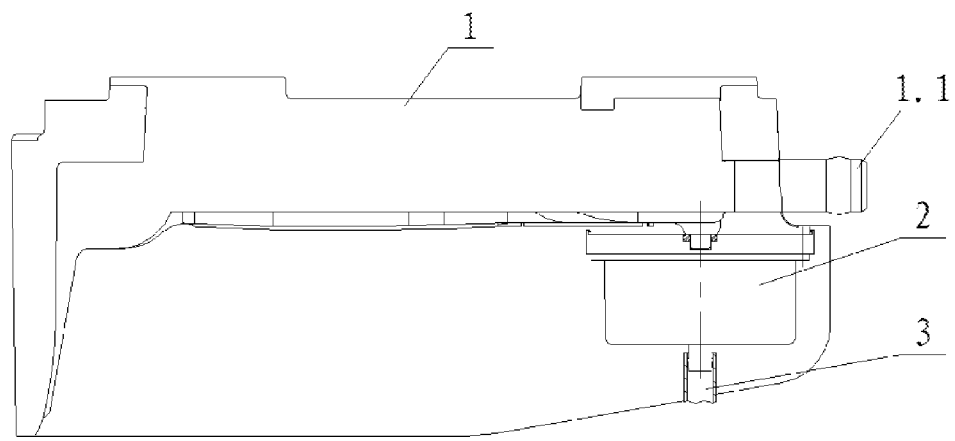
FIG. 1 is a schematic view of the present invention.
Figure 2:
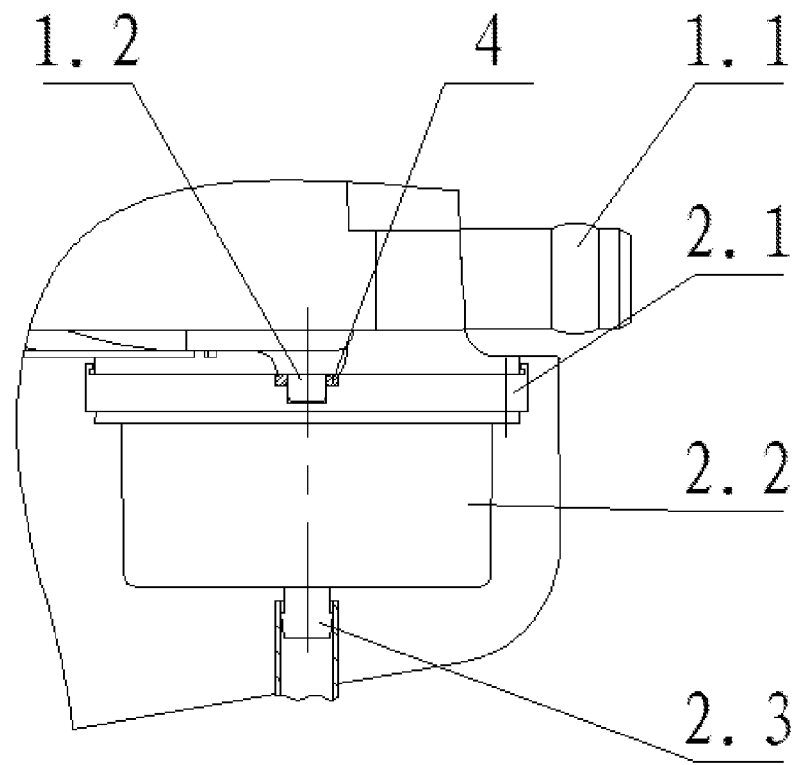
FIG. 2 is a partial enlarged schematic view of FIG. 1.

FIG. 1 and FIG. 2 show a new kind of air filter assembly with charcoal canister, comprising air filter 1 and charcoal canister 2. The air filter 1 and charcoal canister 2 are clamped so as to be connected with each other.

Furthermore, the ventilating nozzle 1.2 is disposed on said air filter 1, the air outlet is disposed on the charcoal canister 2, and the ventilating nozzle 1.2 and the air outlet are connected by clamping. In order to strengthen the tightness between the ventilation nozzle 1.2 and the air outlet, the seal ring 4 is disposed between the ventilation nozzle 1.2 and the air outlet.

Furthermore, the charcoal canister 2 comprises a charcoal cap 2.1, and a canister body 2.2. The canister body 2.2 comprises a filling room with an upper opening, and fuel-absorption substrate is filled in the filling room. The charcoal cap 2.1 covering the upper opening of the filling room is disposed above the canister body 2.2. The air outlet is disposed on the charcoal cap 2.1. The air inlet 2.3 is disposed on the bottom of the canister body 2.2, and the air inlet 2.3 is connected to the fuel tank by fuel pipe 3.

Furthermore, the fuel-absorption substrate is activated charcoal. In this embodiment, although the connection of the charcoal cap 2.1 and the air filter 1 is realized by the ventilating nozzle 1.2 and the air outlet being connected by clamping, in order to strengthen the connection of the charcoal canister 2 and the air filter 1, the charcoal cap 2.1 and the air filter 1 can be connected by bolts.

The working method of the present invention includes the vent nozzle 1.1 being disposed on the air filter 1. The fuel vapor in the fuel tank enters the charcoal canister 2 through the fuel pipe 3, and is discharged to the atmosphere after it goes through the fuel-absorption substrate. The fuel vapor from the charcoal canister 2 goes through the ventilating nozzle 1.2, the air filter 1, then the vent nozzle 1.1, then gets discharged to the atmosphere.

The above-described preferred embodiments of the present invention is not intended to limit the present invention, any modification within the spirit and principles of the present invention, made by the equivalent replacement, improvement, etc., should be included in the protection of the present invention within the range.

I claim:

1. An air filter assembly comprising:
   an air filter;
   a charcoal canister, said air filter and said charcoal canister being clamped to each other;
   a ventilating nozzle disposed on said air filter; and
   an air outlet disposed on said charcoal canister, said ventilating nozzle removably inserting into said air outlet so as to clamp said ventilating nozzle to said air outlet.

2. The air filter assembly, according to claim 1, further comprising: a seal ring disposed between said ventilating nozzle and said air outlet.

3. The air filter assembly, according to claim 1, wherein said charcoal canister comprises a charcoal cap, and a canister body, said canister body being comprised of a filling room with an upper opening, and fuel-absorption substrate filled in said filling room, said charcoal cap being placed above of said canister body and covering an upper opening of said filling room, said air outlet being disposed on said charcoal cap, said canister body having an air inlet being disposed on a bottom of said canister body.

4. The air filter assembly, according to claim 3, wherein said fuel-absorption substrate is activated charcoal.

* * * * *